(12) United States Patent
Hsieh

(10) Patent No.: US 8,904,497 B2
(45) Date of Patent: Dec. 2, 2014

(54) PROVIDING AN OPERATIONAL DASHBOARD

(75) Inventor: Yi-Chang Hsieh, Cammeray (AU)

(73) Assignee: Honeywell International Inc., Morristown, NJ (US)

( * ) Notice: Subject to any disclaimer, the term of this patent is extended or adjusted under 35 U.S.C. 154(b) by 35 days.

(21) Appl. No.: 13/566,667

(22) Filed: Aug. 3, 2012

(65) Prior Publication Data
US 2014/0040998 A1   Feb. 6, 2014

(51) Int. Cl.
*H04L 29/00*   (2006.01)

(52) U.S. Cl.
USPC ............................................................ 726/5

(58) Field of Classification Search
USPC ................................................. 713/155–159
See application file for complete search history.

(56) References Cited

U.S. PATENT DOCUMENTS

| 7,984,384 B2 | 7/2011 | Chaudhri et al. |
| 2007/0101433 A1* | 5/2007 | Louch et al. .................... 726/25 |
| 2008/0103798 A1* | 5/2008 | Domenikos et al. .............. 705/1 |

* cited by examiner

*Primary Examiner* — Ghazal Shehni
(74) *Attorney, Agent, or Firm* — Brook, Cameron & Huebsch, PLLC

(57) ABSTRACT

Systems, methods, and devices for providing an operational dashboard are described herein. One method includes receiving operational data associated with a system, receiving credentials associated with a user of a user device including a number of display elements configurable by the user, and determining a particular portion of the operational data to provide to the user via the display elements of the user device based, at least in part, on the credentials.

19 Claims, 4 Drawing Sheets

PROVIDING AN OPERATIONAL DASHBOARD

TECHNICAL FIELD

The present disclosure relates to providing an operational dashboard.

BACKGROUND

Facilities (e.g., buildings, departments, warehouses, plants, factories, refineries, airports, laboratories, mines, etc.) can have various operational systems associated therewith. Operational systems can be and/or include, for example, fire safety systems, heating, ventilation, and air conditioning (HVAC) systems, security systems, access control systems, and/or energy management systems, among other types of systems.

Monitoring various aspects of such a system may allow for increased efficiency, effectiveness, and/or satisfaction of various personnel (e.g., operators, managers, chief security officers (CSOs), etc.) associated with the system, for instance. Monitoring may include gathering various data associated with a system, though previous approaches may be ineffective with respect to measures such as, for example, interpreting and/or summarizing such data.

DETAILED DESCRIPTION

Figure 1:
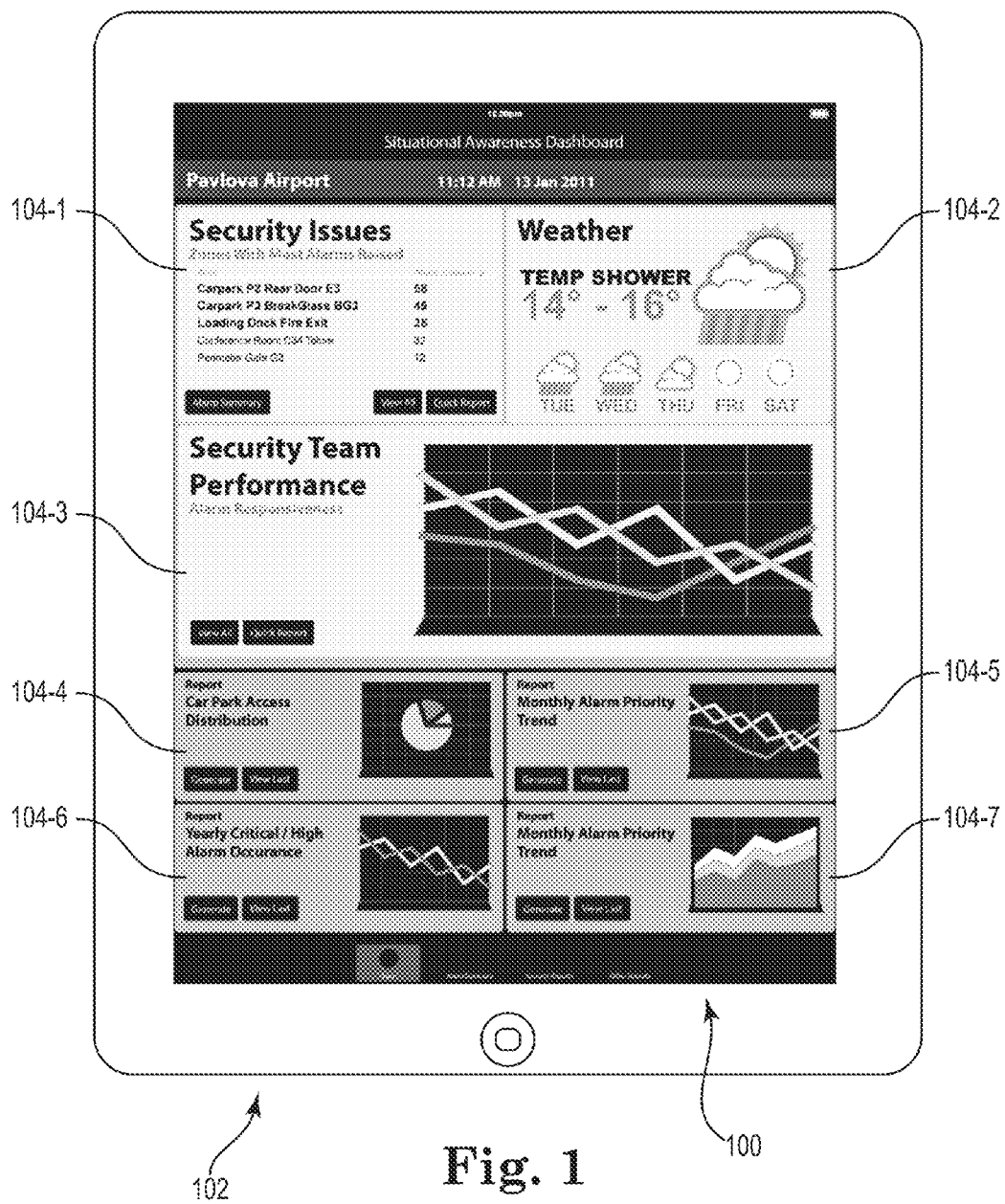
FIG. 1 illustrates a display including a number of widgets of an operational dashboard application in accordance with one or more embodiments of the present disclosure.

Methods, systems, and computer-readable media for providing an operational dashboard are described herein. For example, one or more embodiments include receiving operational data associated with a system, receiving credentials associated with a user of a user device including a number of display elements configurable by the user, and determining a particular portion of the operational data to provide to the user via the display elements of the user device based, at least in part, on the credentials.

Various embodiments of the present disclosure provide for a unified interest layer (referred to herein as a "dashboard") allowing at-a-glance views of various aspects (e.g., performance indicators, statistics, analytics, and/or metrics) associated with an operational (e.g., working) system. Systems, as used herein, can refer to various systems including, for example, fire safety systems, heating, ventilation, and air conditioning (HVAC) systems, security systems, access control systems, and/or energy management systems, among other types of systems. In a general sense, dashboards of the present disclosure can display data associated with the various aspects of such systems (herein referred to as "information" in and/or as summaries, trends, comparisons, and/or exceptions, among other ways of displaying information.

Embodiments of the present disclosure can receive (e.g., gather) data from a number of systems and display information in various displays, determined based on an identity and/or role of a user, for instance. Embodiments of the present disclosure can display a dashboard on various user devices including, by way of example and not limitation, desktop computers, laptop computers, tablets, smart phones, and/or personal digital assistants (PDAs), for instance. Further, embodiments of the present disclosure can display dashboards on various computing and/or device platforms (e.g., operating systems).

Accordingly, embodiments of the present disclosure can provide various users (e.g., operators, managers, chief security officers (CSOs), etc.) easily viewable and easily understandable information associated with the various systems described herein. Such users can use the provided information to make more informed and/or higher-level decisions than by using previous approaches. For example, managers can use such information to make decisions regarding contracts, purchases, and/or personnel management, among other decisions.

Dashboards in accordance with one or more embodiments of the present disclosure can include a number of display elements, sometimes referred to herein as "widgets." Widgets in accordance with embodiments of the present disclosure can include software accessories for providing (e.g., displaying) various information associated with various aspects of systems such as those previously discussed.

Widgets can interact with remote sources of information, such as servers (e.g., computing device 318 discussed below in connection with FIG. 3), to provide information. Widgets can be used to access various pages (e.g., html webpages). Widgets can be interactive, so that a user performs common input operations (e.g., clicking a mouse, typing on a keyboard, touching a screen) to utilize the functionality of a widget.

Dashboards (e.g., widgets of a dashboard) in accordance with one or more embodiments of the present disclosure can be user-configurable. A user can interact with and/or configure widgets as desired, for instance. In some embodiments, a user can move widgets around the display, and/or can resize widgets if applicable. In various embodiments, some widgets may be resizable, and some may be of fixed size. Some widgets can automatically resize themselves based on the amount or nature of the information being displayed.

In some embodiments, widgets may overlap one another. In some embodiments, widgets do not overlap one another; if a user attempts to move one widget to the position occupied by another widget, one of the widgets may automatically move out of the way to make room.

In various embodiments, position(s), configuration(s), and/or size(s) of widgets can be saved when the dashboard is dismissed, so that the same state can be restored the next time the dashboard is invoked. Various embodiments allow a user to manipulate, adjust, and/or otherwise personalize particular information included in dashboards and/or widgets in accordance with the present disclosure.

Personalization of displayed information may be determined and/or limited by a user's role (e.g., identity). For example, a high-level user (e.g., a CSO) may desire higher-level summarized information (e.g., summarized monthly). Higher-level information can include, for example, monthly spending associated with a security system. A lower-level user (e.g., a team manager) may desire lower-level information (e.g., current and/or real-time information). Lower-level information can include, for example, current locations of employees and/or access devices (e.g., cards).

Display of information to a particular user can therefore be determined based on a role of the user. The role can be determined based upon user input of credentials and/or authentication information (e.g., log in).

Dashboards can be overlaid on an existing desktop user interface of a user device, for instance. The user interface can be darkened, brightened, blurred, distorted, or otherwise altered so as to emphasize that it is temporarily inactivated. The existing desktop can be visible behind the dashboard. In some embodiments, the existing desktop is not visible while the dashboard is active. In some embodiments, the desktop can be shrunk to a small portion of the screen while the dashboard is active, and can be reactivated by various user inputs.

A number of embodiments of the present disclosure can include the capability to alert a user when a widget needs attention or has new information to display to the user, even if the dashboard is not currently active. For example, if a particular portion of security data (e.g., alarm activations per week) exceeds a particular threshold (e.g., 100 activations) a user may be alerted. A distinctive sound can be played, a dialog box can be presented, and/or a text alert can be displayed. Such alerts can be of a generalized type, may indicate the specific widget that issued the alert, and/or can display additional information specifying the nature of the alert. The user can then activate the dashboard to see the widget that issued the alert, for instance. Alternatively, the dashboard can automatically be activated in such a situation, or a dialog box can be presented to allow the user to indicate whether or not the dashboard should be activated.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 300 in FIG. 3.

As will be appreciated, elements shown in the various embodiments herein can be added, exchanged, and/or eliminated so as to provide a number of additional embodiments of the present disclosure. As used herein, "a" or "a number of" something can refer to one or more such things. For example, "a number of widgets" can refer to one or more widgets. In addition, as will be appreciated, the proportion and the relative scale of the elements provided in the figures are intended to illustrate the embodiments of the present invention, and should not be taken in a limiting sense.

For purposes of illustration, various embodiments are herein described in the context of a particular operational system (e.g., a security system). As will be appreciated, and as is previously discussed, embodiments of the present disclosure do not limit systems and/or dashboards to a particular type, and such examples are not to be taken in a limiting sense.

FIG. 1 illustrates a display 100 (e.g., of a user device 102) including a number of widgets of an operational dashboard application in accordance with one or more embodiments of the present disclosure. As illustrated in FIG. 1, display 100 includes a security issues widget 104-1, a weather widget 104-2, a security team performance widget 104-3, a car park access distribution widget 104-4, a first monthly alarm priority trend widget 104-5, a yearly critical/high alarm occurrence widget 104-6, and second additional monthly alarm priority trend widget 104-7 (sometimes generally referred to herein as widgets 104-1-7). As will be appreciated, embodiments of the present disclosure do not limit the number, names and/or appearance of widgets to those illustrated by the Figures herein.

User device 102 can be various devices capable of displaying an operational dashboard in accordance with embodiments of the present disclosure (e.g., a desktop computer, laptop computer, tablet, smart phone, and/or personal digital assistants (PDAs), for instance, among others). In various embodiments, the dashboard can be available to a user from a remote location. Configuration information for the user's dashboard can be stored at a remote server (e.g., computing device 318, discussed below in connection with FIG. 3), pursuant to a user command or automatically. The user can then enter credentials and/or authentication information (e.g., log in) from user device 100, and be presented with display 100, for instance.

Display 100 can be a graphic user interface (GUI) that can provide (e.g., display and/or present) and/or receive information (e.g., data and/or images) to and/or from a user (e.g., operator) of user device 102. For example, display 100 can include a screen that can provide information to a user of user device 102 and/or receive information entered into display 100 by the user. However, embodiments of the present disclosure are not limited to a particular type of display.

Widgets 104-1-7 and/or user device 102 can form a request for data, and transmit the request according to HTTP or some other network protocol. A computing device, (e.g., computing device 318 discussed below in connection with FIG. 3) can respond to the request with information; and widgets 104-1-7 can use the information in forming the output that will be displayed via display 100. For example, such operations can take place in response to JavaScript code within widgets 104-1-7.

With respect to security system examples discussed herein, information displayed by widgets 104-1-7 can include, by way of example and not limitation, access point events and trends, employee location, access card usage, alarm counts, employee activity distribution, access point usage, alarm responsiveness, system resource statuses, system override activities, access point activity levels, access point health (e.g., maintenance history) visitor activity, carpark management information, new employee trends, and/or hard drive usage.

As shown in FIG. 1, widgets 104-1-7 can display information in various manners. Information can be displayed via charts, graphs, text, images, icons, trends, symbols, etc. Widgets 104-1-7 can allow a user to visualize increased and/or decreased levels of information detail via various inputs (e.g., touching particular portions of widgets 104-1-7).

Widgets 104-1-7 can interact with various functionalities of user device 102. Such functionalities can include image capturing functionalities (e.g., a camera) and/or location functionalities (e.g., using Global Positioning System (GPS) technology), for instance.

In an example, a user may be navigating a particular portion of a facility having a security system associated therewith. The user can activate a GPS functionality of user device 102 such that, via one or more of widgets 104-1-7, the user can visualize security cameras of the security system within a particular distance from the user's geographical location (e.g., a particular area having a radius of 40 meters). Such information can allow the user to make various decisions such as, for example, a decision to install additional cameras within the area.

Figure 2:
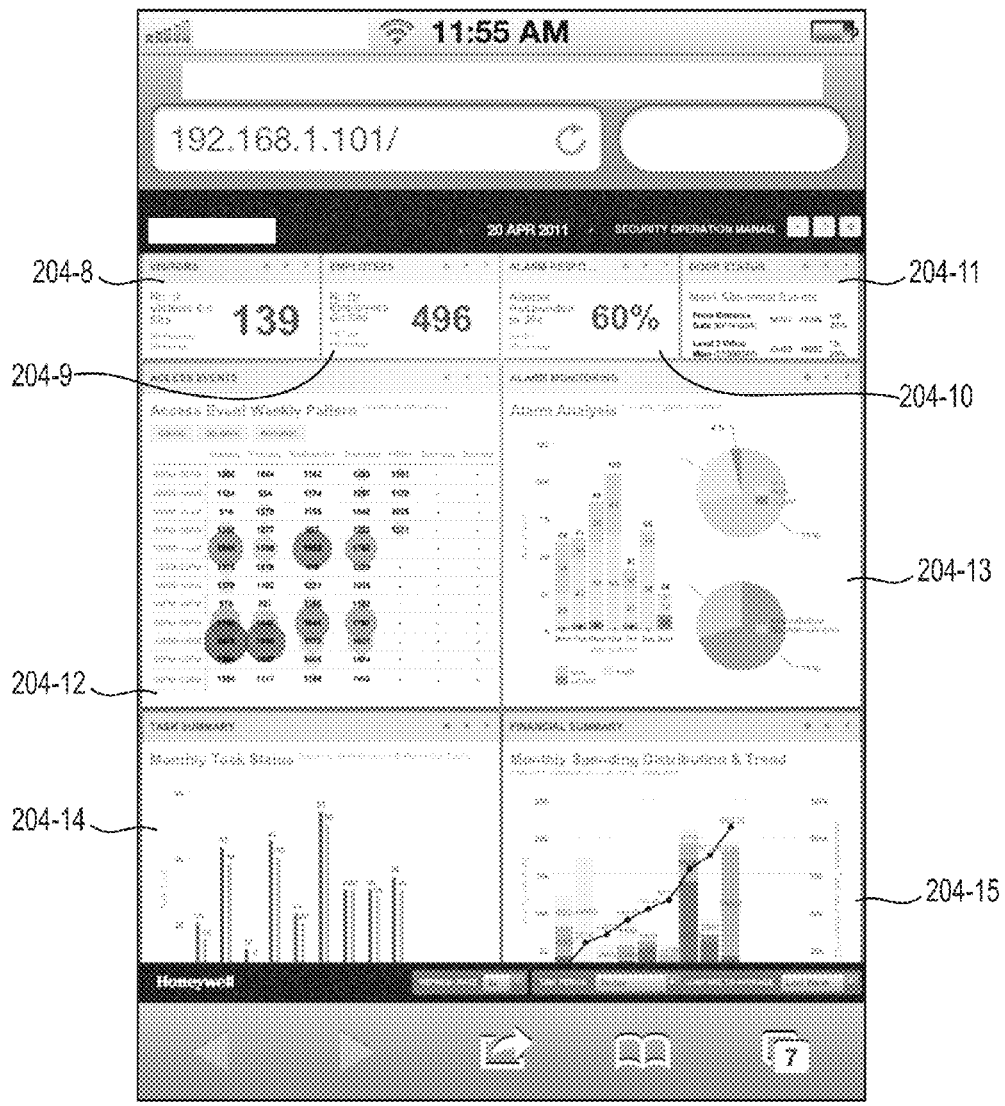
FIG. 2 illustrates a display including a number of widgets displayed as an operational webpage dashboard in accordance with one or more embodiments of the present disclosure.

FIG. 2 illustrates a display 200 including a number of widgets displayed as an operational webpage dashboard in accordance with one or more embodiments of the present disclosure. As illustrated in FIG. 2, display 200 includes a number of visitors on site widget 204-8, a number of employees on site widget 204-9, an alarms responded in 30 seconds widget 204-10, a most abnormal events widget 204-11, an access event weekly pattern widget 204-12, an alarm analysis widget 204-13, a monthly task status widget 204-14, and a monthly spending distribution & trend widget 204-15 (sometimes generally referred to herein as widgets 204-8-15). In a manner analogous to that previously discussed in connection with FIG. 1, embodiments of the present disclosure do not limit the number and/or appearance of widgets 204-8-15 to those illustrated in FIG. 2.

In embodiments including a number of widgets displayed as a webpage such as that illustrated in FIG. 2, widgets 204-8-15 can be displayed using HTML and related web technology. Computing device 318 (discussed below in connection with FIG. 3) can manage and/or launch various processes of widgets 204-8-15.

In some embodiments, display 200 can display widgets 204-8-15 without a conventional window frame, menu bar, or other components typically associated with on-screen windows. Such embodiments can provides a clean, straightforward display of the overall dashboard that avoids confusion and clutter, for instance. Widgets 204-8-15 can be displayed by rendering web pages into a "WebView," for instance. The size of a WebView can be defined by metadata associated with the corresponding widget(s) 204-8-15.

Figure 3:
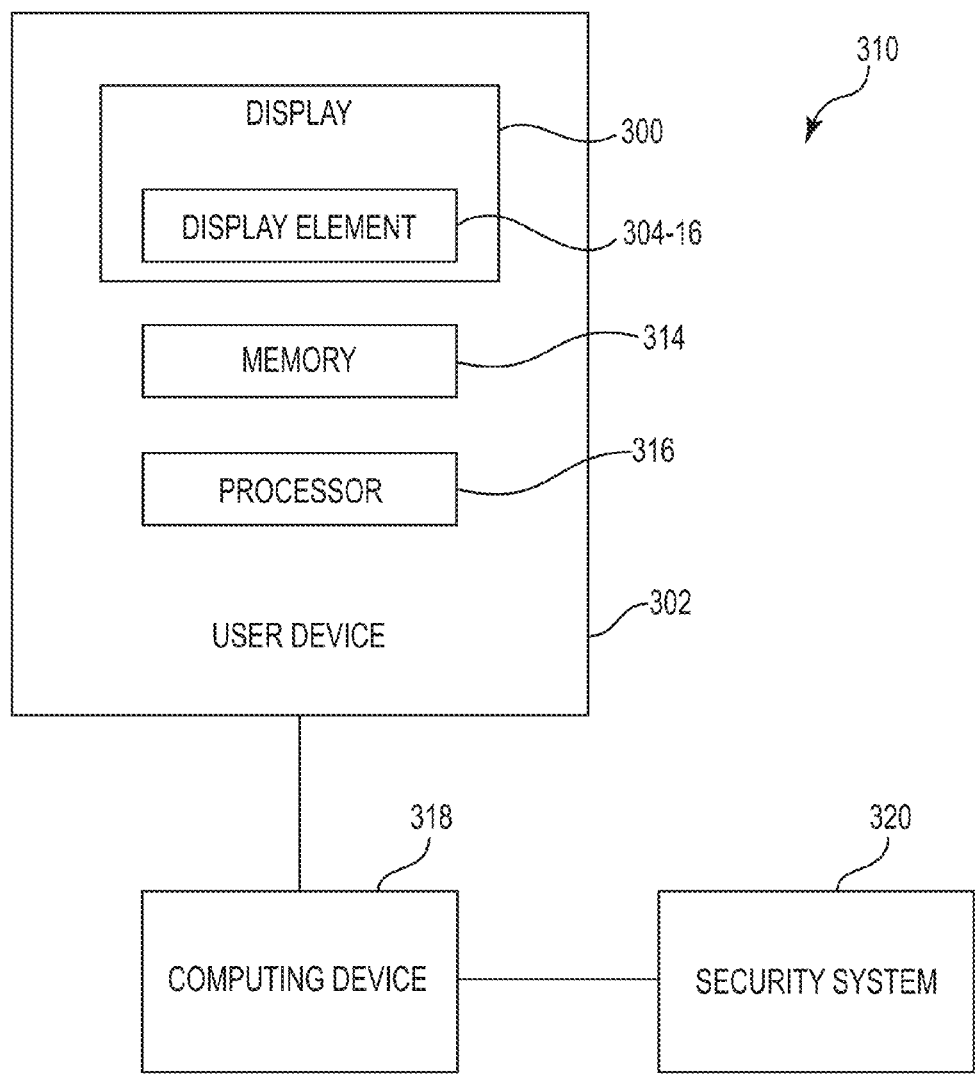
FIG. 3 illustrates a system for providing an operational dashboard in accordance with one or more embodiments of the present disclosure.

FIG. 3 illustrates a system 310 for providing an operational dashboard in accordance with one or more embodiments of the present disclosure. As shown in FIG. 3, system 310 includes a user device 302, a computing device 318, and a security system 320. User device 302, computing device 318 and/or security system 320 can be connected via a wired and/or wireless connection, such as a network, for instance, to allow data to be transferred in any direction between user device 302, computing device 104 and/or security system 320. The network can be the Internet and/or a private network belonging to an entity, for example. The entity can be defined as an individual, group of individuals, and/or a business.

Computing device 318 can include a memory and a processor configured to execute executable instructions stored in the memory to perform various tasks in a manner analogous to user device 302, discussed below. For example, computing device 318 can be used to perform the method as discussed in relation to FIG. 4.

Computing device 318 can receive security data associated with security system 320 (e.g., from security system 320). Information associated with security system 320 can be communicated by a computing device associated with security system 320 and/or by various other devices (e.g., sensors, alarms, programmable communicating thermostats (PCTs), occupancy detectors, cameras, card readers), for instance.

Computing device 318 can provide (e.g., transmit) a portion of the security data responsive to a request (e.g., a request, as discussed below, made by user device 302). Computing device 318 can include an Application Programming Interface (API), for instance, associated with display element 304-16. The API can gather a particular portion of security data received from security system 320 configured to be displayed as information by display element 304-16. A particular portion of security data can refer to security data from a particular time period (e.g., a particular month), and/or security data associated with a particular aspect of security system 320 (e.g., alarm data), for instance, among other portions of security data.

Additionally, computing device 318 can include a number of APIs, each associated with a respective display element of display 300. Where appropriate, authentication and/or user verification may be required before computing device 318 provides requested data. The information can be transmitted across a secure channel and/or encrypted prior to transmission, according to various techniques.

Providing security data can be in response to a determination that user device 302 is connected (e.g., wired and/or wirelessly connected) to computing device 318. As such, security data can be updated upon subsequent reconnection if the connection is lost. Security data can be updated responsive to user inputs and/or according to a schedule, for instance. Security data can be provided along with an indicator associated with a time it was provided (e.g., a time stamp), for instance. Such an indicator can be produced and/or displayed by display 300 of user device 302 (e.g., by display element 304-16) in association with received data.

Computing device 318 can store dashboard configuration information. Dashboard configuration information can be used by computing device 318 and/or user device 302 to specify the configuration options for displaying display element 304-16. Dashboard configuration information can include access levels and the like based on roles.

As shown in FIG. 3, user device 302 includes a display 300. Display 300 can be analogous to display 100 and/or display 200 previously discussed in connection with FIGS. 1 and/or 2, respectively, for instance. As shown in FIG. 3, display 300 includes a display element 304-16. Display element 304-16 can be analogous to one or more of widgets 104-1-7 and or widgets 204-8-15, previously discussed in connection with FIGS. 1 and/or 2, respectively, for instance.

As shown in FIG. 3, user device 302 includes a processor 316 and a memory 314. Memory 314 can be coupled to processor 316. Memory 314 can be volatile or nonvolatile memory. Memory 314 can also be removable (e.g., portable) memory, or non-removable (e.g., internal) memory. For example, memory 314 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 314 is illustrated as being located in user device 302, embodiments of the present disclosure are not so limited. For example, memory 314 can also be located internal to another computing resource (e.g., enabling computer readable instructions to be downloaded over the Internet or another wired or wireless connection). Memory 314 can also store executable instructions, such as, for example, computer readable instructions (e.g., software), for providing an operational dashboard according one or more embodiments of the present disclosure.

Processor 316 can execute the executable instructions stored in memory 314 in accordance with one or more embodiments of the present disclosure. For example, processor 316 can execute the executable instructions stored in memory 314 to cause 300 display of user device 302 to include display element 304-16, wherein display element 304-16 is configured to display summarized security data associated with security system 320.

For example, display element 304-16 can be preinstalled on user device 302 (e.g., in memory 314). In other embodiments, display element 304-16 is not preinstalled, but can be installed in response to various user input(s). In various embodiments, a user can download display element 304-16 onto display 300 from a repository associated with and/or maintained by computing device 318, for instance. Such a download (e.g., installation) can be and/or be a portion of a fully functional application containing related functionality (e.g., additional display elements).

Processor 316 can execute the executable instructions stored in memory 314 to receive security data from computing device 318 responsive to an authenticated request (e.g., a request made by user device 302). Processor 316 can execute the executable instructions stored in memory 314 to cause display element 304-16 of display 300 of user device 302 to display a summary of a portion of the security data. Displaying a summary of a portion of the security data can include agglomerating the security data and/or converting it into a format specified by display element 304-16 (e.g., converting the data to information displayed by display element 304-16).

Figure 4:
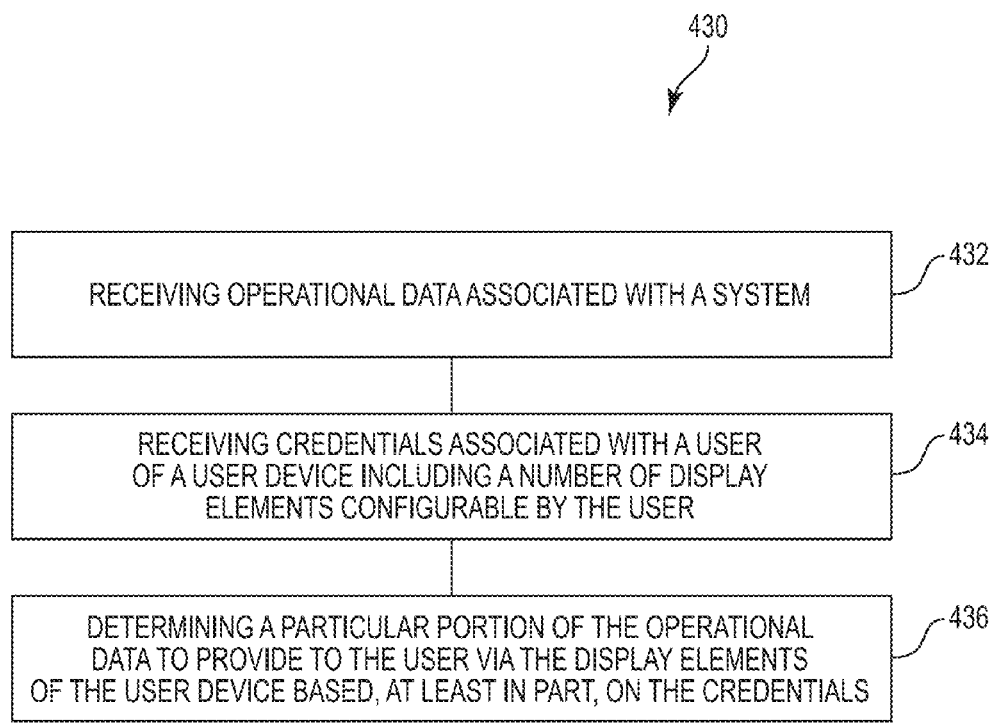
FIG. 4 illustrates a method for providing an operational dashboard in accordance with one or more embodiments of the present disclosure.

FIG. 4 illustrates a method 430 for providing an operational dashboard in accordance with one or more embodiments of the present disclosure. As previously discussed, method 430 can be performed by computing device 318, previously discussed in connection with FIG. 3.

At block 432, method 430 includes receiving operational data associated with a system. Operational (e.g., security) data can be received in various manners and/or from various systems such as those previously discussed.

At block 434, method 430 includes receiving credentials associated with a user of a user device including a number of display elements configurable by the user. Receiving credentials can include authenticating a user and/or determining a role associated with a user in a manner analogous to that previously discussed, for instance.

At block 436, method 430 includes determining a particular portion of the operational data to provide to the user via the display elements of the user device based, at least in part, on the credentials. Determining data to provide to users can be based upon a determined role in a manner analogous to that previously discussed, for instance.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for providing an operational dashboard, comprising:
   receiving operational data associated with a system of a facility from at least one of a plurality of sensors associated with the facility;
   receiving credentials associated with a user of a user device including a number of display elements configurable by the user;
   determining a role of the user based on the credentials; and
   determining a particular portion of the operational data to provide to the user via the display elements of the user device based, at least in part, on the determined role.

2. The method of claim 1, wherein the method includes receiving security data from a security system.

3. The method of claim 1, wherein the method includes providing the particular portion to the user via the display elements, wherein the display elements are included in a portion of an application stored on the user device.

4. The method of claim 1, wherein the method includes providing the particular portion to the user via the display elements, wherein the display elements are displayed as a webpage accessed by the user device.

5. The method of claim 1, wherein the method includes determining the particular portion of the operational data to provide the user based, at least in part, on a geographical location of the user device determined using a location functionality of the user device.

6. The method of claim 1, wherein the method includes storing a configuration of the display elements in association with the credentials.

7. A non-transitory computer-readable medium storing instructions thereon, the instructions executable by a processor to:
   cause a display of a user device to include a display element, wherein the display element is configured to display summarized security data associated with a security system of a facility;
   receive security data from at least one of a plurality of sensors associated with the security system of the facility responsive to an authenticated request; and
   cause the display element of the display of the user device to display a summary of a portion of the security data, wherein the portion is determined based on a role of a user that made the authenticated request.

8. The computer-readable medium of claim 7, wherein the instructions include instructions executable to cause the display element to display the summary of the portion of the security data as a trend associated with a particular aspect of the security system over a particular time period.

9. The computer-readable medium of claim 7, wherein the instructions include instructions executable to receive the security data responsive to a determination that the user device is connected to a computing device.

10. The computer-readable medium of claim 9, wherein the instructions include instructions executable to receive updated security data responsive to a determination that the user device is reconnected to the computing device.

11. The computer-readable medium of claim 7, wherein the instructions include instructions executable to:
    cause the display of the user device to include an additional display element; and
    store a configuration of the display element and the additional display element in a memory of the user device.

12. The computer-readable medium of claim 7, wherein the instructions include instructions executable to convert the received security data to a format specified by the display element.

13. A system, comprising:
    a computing device, configured to:

receive security data associated with a security system of a facility from at least one of a plurality of sensors of the security system of the facility; and provide a particular portion of the security data corresponding to a particular role responsive to a request; and a display device, configured to:

make the request;

receive the portion of the security data; and display the portion of the security data via a user-configurable display element.

14. The system of claim 13, wherein the computing device includes an application programming interface configured to receive the request for the portion of the security data and gather the portion of the security data responsive to the request.

15. The system of claim 13, wherein the display device is configured to receive an input from a user to change a level of detail associated with the displayed portion of the security data.

16. The system of claim 13, wherein the display device is configured to receive the user-configurable display element from a repository associated with the computing device.

17. The system of claim 13, wherein the display device is configured to display the portion of the security data via the user-configurable display element with an indicator associated with a time the portion of the security data was received.

18. The system of claim 13, wherein the display device is configured to make the request in response to a user input associated with the user-configurable display element.

19. The system of claim 13, wherein the display device is configured to provide an alert responsive to the displayed portion of the security data exceeding a particular threshold.

* * * * *